(12) United States Patent
Suzuki (10) Patent No.: US 10,261,676 B2
(45) Date of Patent: Apr. 16, 2019

(54) VEHICULAR APPARATUS AND VEHICULAR APPARATUS SYSTEM

(71) Applicant: DENSO CORPORATION, Kariya, Aichi-pref. (JP)

(72) Inventor: Toshifumi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 135 days.

(21) Appl. No.: 15/305,959

(22) PCT Filed: May 27, 2015

(86) PCT No.: PCT/JP2015/002669
§ 371 (c)(1),
(2) Date: Oct. 21, 2016

(87) PCT Pub. No.: WO2015/186316
PCT Pub. Date: Dec. 10, 2015

(65) Prior Publication Data
US 2017/0046050 A1 Feb. 16, 2017

(30) Foreign Application Priority Data

Jun. 2, 2014 (JP) .................................. 2014-114280

(51) Int. Cl.
*G06F 3/0484* (2013.01)
*G06F 9/451* (2018.01)
(Continued)

(52) U.S. Cl.
CPC .......... *G06F 3/04842* (2013.01); *B60K 35/00* (2013.01); *B60K 37/02* (2013.01);
(Continued)

(58) Field of Classification Search
None
See application file for complete search history.

(56) References Cited

U.S. PATENT DOCUMENTS 7,053,866 B1 * 5/2006 Mimran ................. G02B 27/01
345/8
2003/0154319 A1 * 8/2003 Araki ........................ G06F 9/46
719/310
(Continued)

FOREIGN PATENT DOCUMENTS

JP 2007230451 A 9/2007
JP 2008094356 A 4/2008
(Continued)

OTHER PUBLICATIONS

Shultz, Greg, "Deep Troubleshooting with the Windows 8 Task Manager", Jul. 12, 2012, https://www.techrepublic.com/blog/windows-and-office/deep-troubleshooting-with-the-windows-8-task-manager-processes-tab/.*

*Primary Examiner* — Christopher J Fibbi
(74) *Attorney, Agent, or Firm* — Harness, Dickey & Pierce, P.L.C.

(57) ABSTRACT

A vehicular apparatus includes: a control portion that executes an internal application pre-installed to the vehicular apparatus and an external application obtained from an external device located outside the vehicular apparatus; a load acquisition portion that acquires a load of the control portion when the external application is executed; and a display portion that displays the load acquired by the load acquisition portion.

6 Claims, 5 Drawing Sheets

(51) Int. Cl.
  *G06F 9/50* (2006.01)
  *B60K 35/00* (2006.01)
  *G06F 11/32* (2006.01)
  *G06F 11/34* (2006.01)
  *B60K 37/02* (2006.01)
  *H04L 29/08* (2006.01)
  *G06F 8/61* (2018.01)
  *G06F 9/44* (2018.01)

(52) U.S. Cl.
  CPC .............. *G06F 8/61* (2013.01); *G06F 9/4443* (2013.01); *G06F 9/451* (2018.02); *G06F 9/50* (2013.01); *G06F 11/32* (2013.01); *G06F 11/34* (2013.01); *H04L 67/06* (2013.01); *B60K 2350/1096* (2013.01); *B60K 2350/352* (2013.01); *B60K 2350/355* (2013.01); *B60K 2350/357* (2013.01)

(56) References Cited

U.S. PATENT DOCUMENTS

| | | | |
|---|---|---|---|
| 2005/0060663 A1* | 3/2005 | Arkeketa | G06F 11/321 715/810 |
| 2011/0185390 A1* | 7/2011 | Faenger | G01C 21/3688 725/75 |
| 2013/0298052 A1* | 11/2013 | Nara | G01C 21/3629 715/764 |

FOREIGN PATENT DOCUMENTS

| | | |
|---|---|---|
| JP | 2013125517 A | 6/2013 |
| JP | 2013126802 A | 6/2013 |
| WO | WO-2008015891 A1 | 2/2008 |

* cited by examiner

VEHICULAR APPARATUS AND VEHICULAR APPARATUS SYSTEM

CROSS-REFERENCE TO RELATED APPLICATIONS

This application is a U.S. National Phase Application under 35 U.S.C. 371 of International Application No. PCT/JP2015/002669 filed on May 27, 2015 and published in Japanese as WO 2015/186316 A1 on Dec. 10, 2015. This application is based on and claims the benefit of priority from Japanese Patent Application No. 2014-114280 filed on Jun. 2, 2014. The entire disclosures of all of the above applications are incorporated herein by reference.

TECHNICAL FIELD

The present disclosure relates to a vehicular apparatus and a vehicular apparatus system.

BACKGROUND ART

Recently, a vehicular apparatus furnished with a function of downloading data from an external server or the like is available. A vehicular apparatus configured to download update data for the vehicular apparatus is described, for example, in Patent Literature 1.

The inventor of the present application has found the followings. A recent vehicular apparatus is provided with not only an internal application runtime environment in which to run a unique application pre-installed to a vehicular apparatus, but also an external application runtime environment in which to run an external application downloaded from an external equipment such as a server.

That is, since an external application is downloaded by a user, it is difficult to predict a type of an external application that will be downloaded, and it is difficult to predict a load generated in the vehicular apparatus by the downloaded external application. In a case where a load generated by running the external application is high, it may become difficult for the vehicular apparatus to function as originally designed, that is, to run an internal application.

PRIOR ART LITERATURE

Patent Literature

Patent Literature 1: JP 2013-125517 A

SUMMARY OF INVENTION

It is an object of the present disclosure to provide a vehicular apparatus capable of reducing an influence given to running of an internal application when the vehicular apparatus is provided with an environment in which an external application can be run.

A vehicular apparatus according to one example of the present disclosure includes: a control portion that executes an internal application pre-installed to the vehicular apparatus and an external application obtained from an external device located outside the vehicular apparatus; a load acquisition portion that acquires a load of the control portion when the external application is executed; and a display portion that displays the load acquired by the load acquisition portion.

A vehicular apparatus system according to one example of the present disclosure includes a vehicular apparatus and a meter device. The vehicular apparatus includes: a control portion that executes an internal application pre-installed to the vehicular apparatus and an external application obtained from an external device located outside the vehicular apparatus; and a load acquisition portion that acquires a load of the control portion when the external application is executed. The meter device is equipped in advance to a vehicle as a separate body from the vehicular apparatus. The meter device has a display portion that displays the load acquired by the load acquisition portion and is connected to the vehicular apparatus to enable mutual communications.

A load of an active external application is visually presented to a user by the display portion. The user is thus able to understand a load of the external application and, for example, opt to deactivate the external application when the load is high. Hence, when the vehicular apparatus is provided with an environment in which an external application can be run, an influence given to running of an internal application can be reduced.

BRIEF DESCRIPTION OF DRAWINGS

The above and other aspects, features and advantages of the present disclosure will become more apparent from the following detailed description made with reference to the accompanying drawings. In the drawings.

PREFERRED EMBODIMENTS FOR CARRYING OUT INVENTION

Hereinafter, embodiments will be described with reference to the drawings. Portions common in respective embodiments below are labeled with the identical reference numerals and a detailed description is not repeated.

(First Embodiment)

Figure 1:
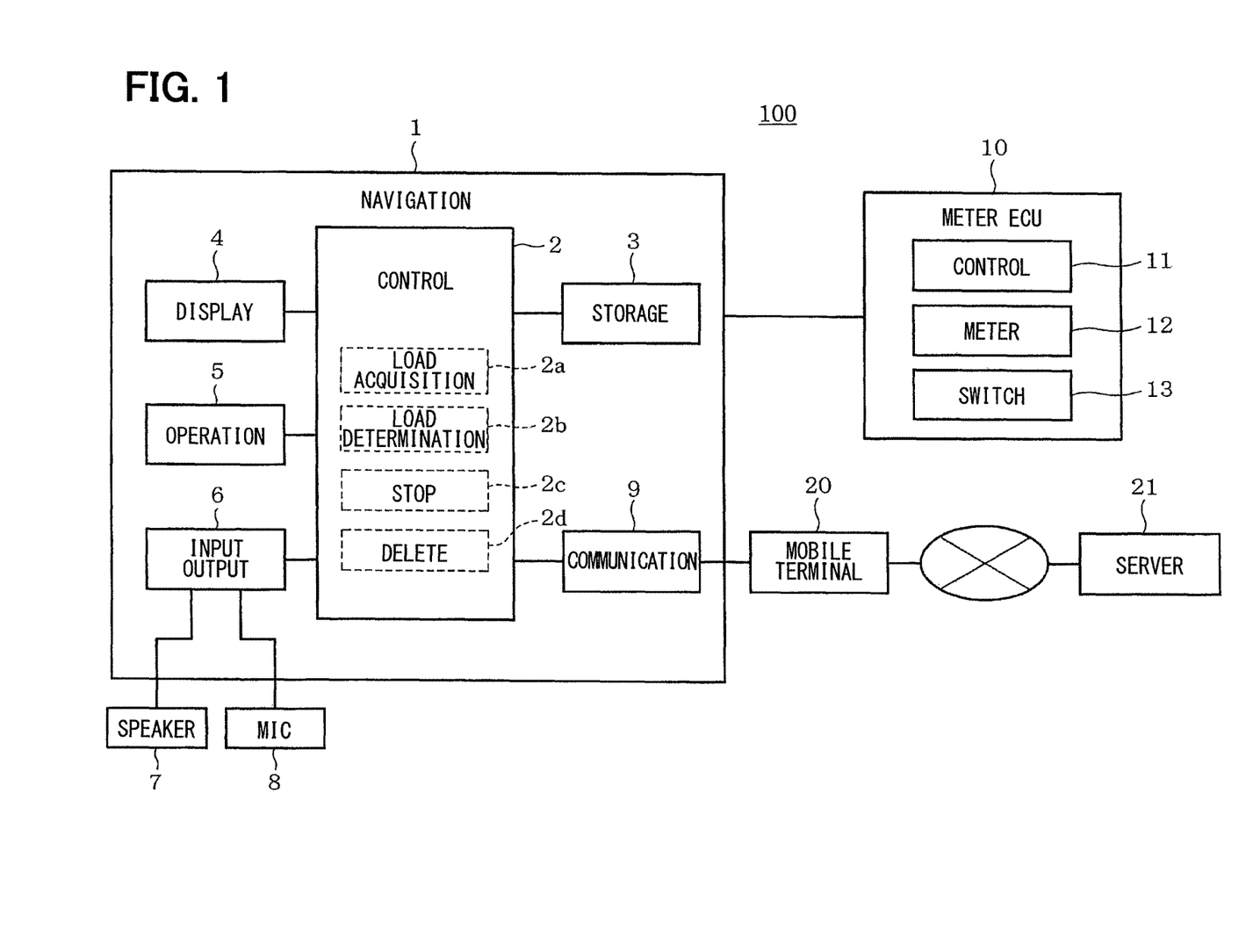
FIG. 1 is a diagram schematically showing an electrical configuration of a vehicular apparatus according to a first embodiment.

FIG. 1 shows a vehicular apparatus 1 of the present embodiment. The vehicular apparatus 1 includes a control portion 2, a storage portion 3, a display portion 4, an operation portion 5, a sound input and output portion 6, a speaker 7, a microphone 8, a communication portion 9, or the like. The present embodiment is a case where the vehicular apparatus 1 is a so-called navigation apparatus providing a navigation function.

Figure 2:
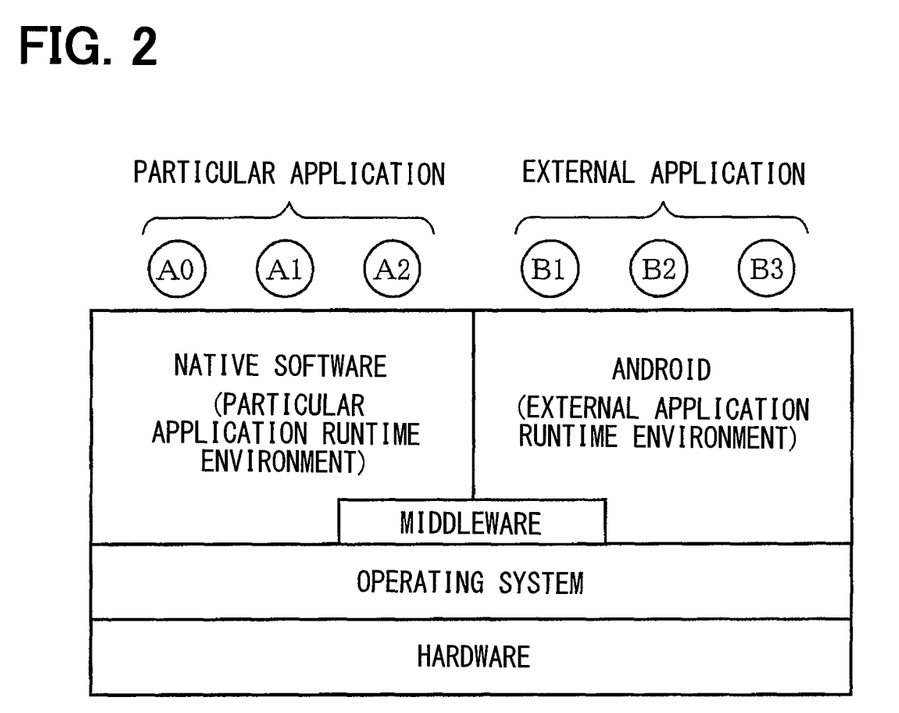
FIG. 2 is a diagram schematically showing a software configuration of the vehicular apparatus.

As is shown in FIG. 2, the vehicular apparatus 1 includes unique internal applications (hereinafter, referred to also as internal applications A1 through A3 for ease of description) pre-installed to the vehicular apparatus 1, an internal application runtime environment (hereinafter, referred to also as native software for ease of description) as an environment in which to run the internal applications, external applications (hereinafter, referred to also as external applications B1 through B3 for ease of description), and an external application runtime environment (hereinafter, referred to also as Android (registered trademark) for ease of description) as an environment in which to run the external applications. The vehicular apparatus 1 is therefore capable of running both of the internal applications and the external applications downloaded from an external device located on the outside of the vehicular apparatus 1. A unique internal application may be referred to as a particular application, and an internal application runtime environment may be referred to as a particular application runtime environment.

The control portion 2 of the vehicular apparatus 1 is configured of a computer having a CPU, a ROM, a RAM, or the like, none of which is shown in the drawing. The control portion 2 is provided with a load acquisition portion 2a, a load determination portion 2b, a stop portion 2c, and a delete portion 2d. The load acquisition portion 2a, the load determination portion 2b, the stop portion 2c, and the delete portion 2d are realized on software by a computer program run on the control portion 2.

The load acquisition portion 2a acquires a load of the control portion 2, more specifically, loads generated by running the external applications described below one by one for each external application. The term, "load", referred to in the present embodiment is defined as a percentage out of 100% processing power of the control portion 2. Hence, when the load is 40%, 60% is the remaining processing power of the control portion 2.

The load determination portion 2b determines magnitude of a load of each external application depending on an active state (running state) of the internal applications. The stop portion 2c deactivates any of the external applications selected by a user. The delete portion 2d deletes the external application selected by the user.

The storage portion 3 stores in advance map data or the like used in the navigation function. The storage portion 3 also stores in advance the internal applications A1 through A3, the native software, the external applications B1 through B3, Android, or the like described above. In addition, the storage portion 3 stores in advance an operating system as a basis on which to run native software and Android.

In the vehicular apparatus 1, an active state of each application is managed by the operating system. The vehicular apparatus 1 is therefore capable of acquiring loads of the respective active applications via the operating system. The acquired loads are periodically sent to a meter ECU 10 via an in-vehicle LAN. Priorities set to processing to acquire the loads and processing to send the acquired loads to the meter ECU 10 are relatively higher than a priority set to display processing of the display portion 4.

The internal applications A1 through A3 are applications to realize original functions furnished to the vehicular apparatus 1. The internal applications A1 through A3 include, for example, an application to accept an operation from the operation portion 5, an application to play contents, such as music and videos, and an application to input and output sounds. The external applications B1 through B3 are applications optionally downloaded by the user, and include game applications and SNS (Social Networking Service) applications, for example.

Incidentally, the numbers of the internal applications and the external applications specified herein are mere examples and are not limited to three. Also, the present embodiment is a case where Android is adopted.

It should be appreciated, however, that the external application runtime environment is not limited to Android and any other appropriate environment can be adopted as well.

The vehicular apparatus 1 is connected to a mobile terminal 20 via the communication portion 9. The external applications are downloaded from a server 21 as an external device via the mobile terminal 20. Alternatively, a memory card interface may be provided to the vehicular apparatus 1 to download the external applications from a memory card.

The vehicular apparatus 1 is also connected to the meter ECU 10 via the in-vehicle LAN. The meter ECU 10 includes a control portion 11, a meter device 12, and switches 13. The meter device 12 is connected to the vehicular apparatus 1 to enable mutual communications. The meter device 12 is provided to an instrument panel of a vehicle and the switches 13 are provided on a periphery of the meter device 12. The switches 13 form a stop portion and a delete portion with the stop portion 2c and the delete portion 2d, respectively.

Figure 3:
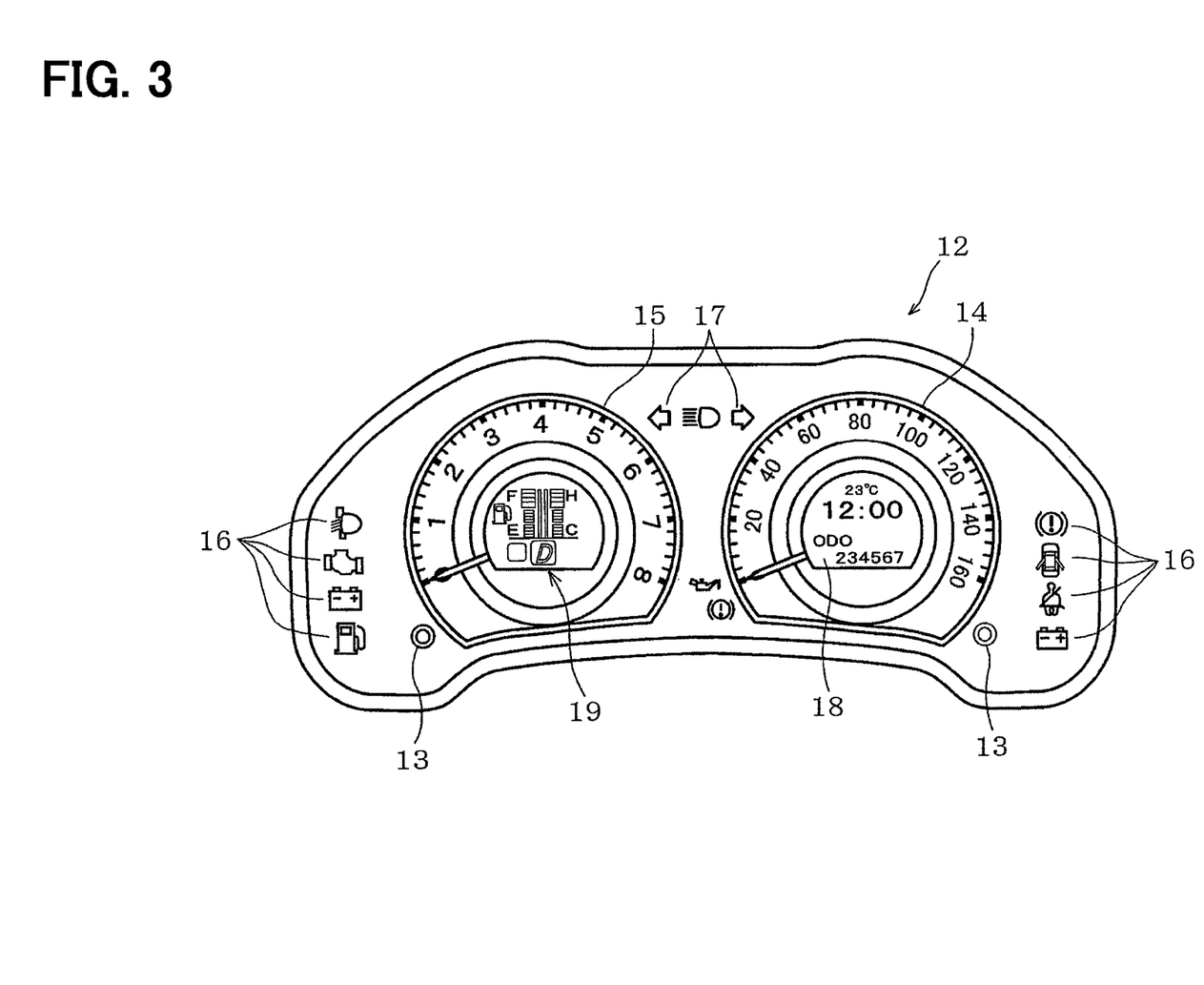
FIG. 3 is a diagram schematically showing a configuration of a meter device.

As is shown in FIG. 3, the meter device 12 includes, for example, a speed meter 14, a tachometer 15, various warning lamps 16, direction indicator lamps 17, or the like. The meter device 12 also includes a first display 18 disposed within the speed meter 14 and a second display 19 disposed within the tachometer 15. In the present embodiment, the vehicular apparatus 1 adopts the first display 18 provided to the meter device 12, which is a separate body from the vehicular apparatus 1 and equipped to the vehicle in advance, as a display portion. The vehicular apparatus 1 and the meter device 12 together correspond to a vehicular apparatus system 100.

Figure 4:
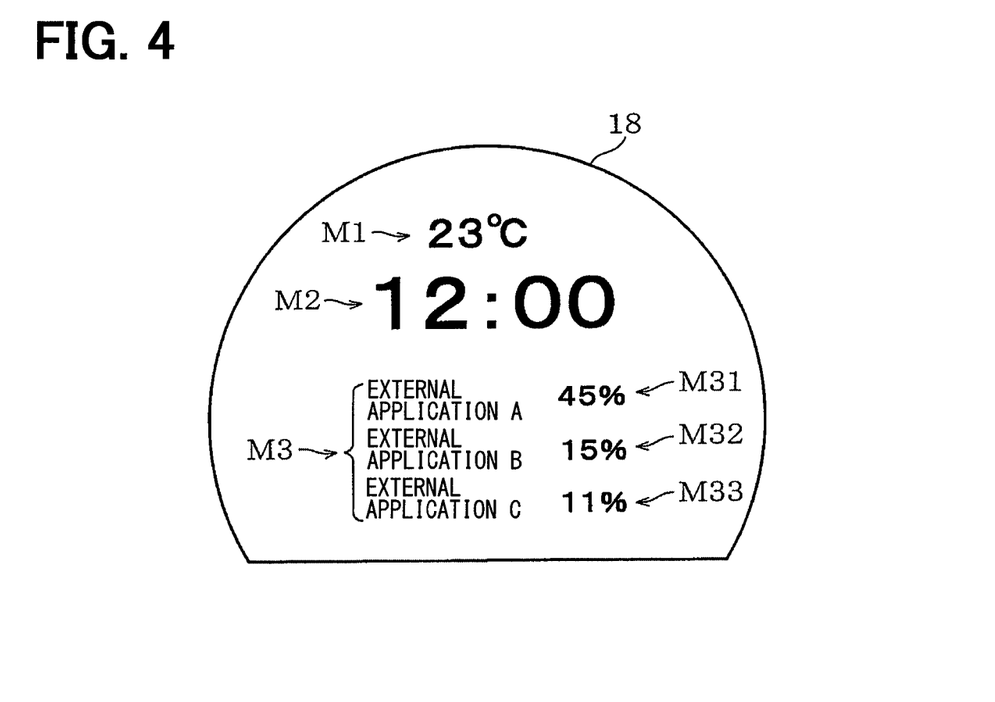
FIG. 4 is a diagram showing an example of a display format for the meter device.

As is shown in FIG. 4, the first display 18 is provided with a display region M1, a display region M2, and a display region M3. For example, an outside air temperature is displayed in the display region M1 and a present time is displayed in the display region M2. Types of display information are set by the user. Names of the active external applications and loads of the respective active external applications are displayed in the display region M3.

More specifically, in the case shown in FIG. 4, the names of the active external applications, "external application A", "external application B", and "external application C", are displayed in the display region M3. Loads of the respective active external applications, "45%", "15%", and "11%", are displayed in load display regions M31 through M33, respectively. The display is updated, for example, when the loads are sent from the vehicular apparatus 1 or at regular intervals, such as once in every second.

In the manner as above, the vehicular apparatus 1 notifies the user of the loads of the external applications visually by displaying the loads of the external applications.

The vehicular apparatus 1 of the present embodiment described above is capable of achieving effects as follows.

The vehicular apparatus 1 displays the names and the loads of the active external applications in the display region M3. The user is thus able to understand the loads of the external applications and, for example, opt to deactivate any of the external applications when the loads are high. Hence, in a case where the vehicular apparatus 1 is provided with an environment in which the external applications can be run, an influence given to running of the internal applications can be reduced.

When loads of the external applications become higher while the external applications are running, the running of the internal applications may be influenced and an operation of the vehicular apparatus 1 may become slow. When an operation of the vehicular apparatus 1 becomes slow, for example, the display in the display portion 4 may not be updated.

In order to eliminate such an inconvenience, the vehicular apparatus 1 displays the loads on the first display 18 provided to the meter device 12, which is a separate body from the vehicular apparatus 1 and equipped to the vehicle in advance. Herein, a delay in transmission of the loads is prevented since a relatively high priority is set to the processing to send the loads from the vehicular apparatus 1 to the meter ECU 10. Also, the meter ECU 10 operates independently of the vehicular apparatus 1. Hence, even when a load of the vehicular apparatus 1 becomes high and an operation becomes slow, a display of the loads by the meter ECU 10 is not slowed down. In short, due to the configuration to display the loads on the first display 18, the user can be notified of the loads in an appropriate manner.

Figure 5A:
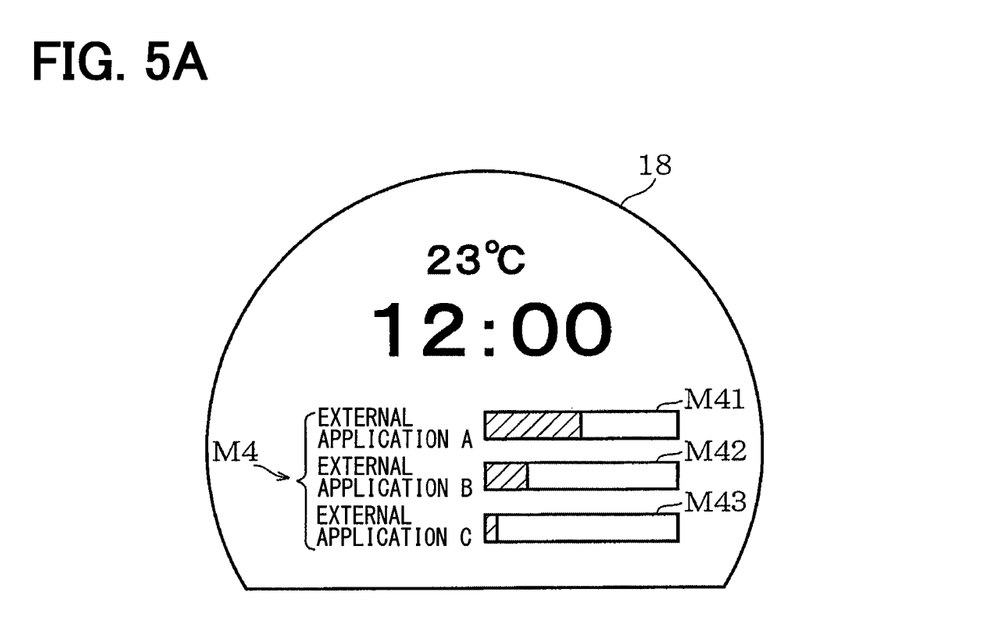
FIG. 5A is a diagram showing another example of the display format for the meter device.

It should be appreciated that the display format shown in FIG. 4 is a mere example and the names and the loads may be displayed in other formats, for example, as are shown in FIG. 5A, FIG. 5B, and FIG. 5C. In the case of FIG. 5A, the names of the external applications, "external application A", "external application B", and "external application C", are displayed in a display region M4 of the first display 18 and loads of the respective external applications are displayed in load display regions M41 through M43 in the form of bar graphs. The display format as above makes it easier for the user to understand by intuition how high the loads are.

Figure 5B:
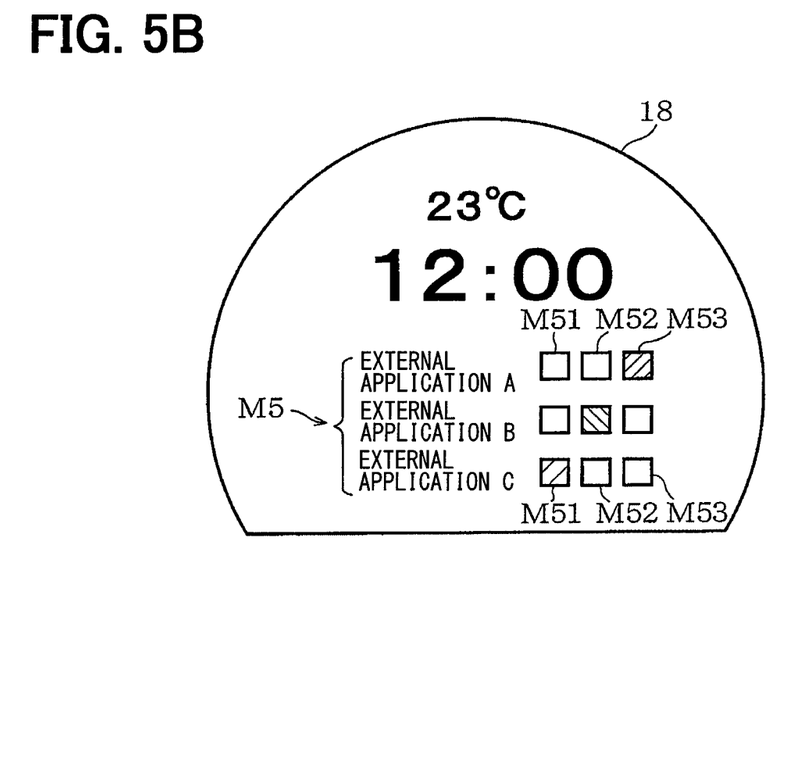
FIG. 5B is a diagram showing a further example of the display format for the meter device.

In the case of FIG. 5B, the names of the external applications, "external application A", "external application B", and "external application C", are displayed in a display region M5 of the first display 18 and load display regions M51 through M53 are provided for each application. The load display regions M51 through M53 are distinguished from one another by displaying the load display regions M51 in green, the load display regions M52 in yellow, and the load display regions M53 in red. Herein, a load increases in order of green, yellow, and red. In FIG. 5B, shading indicates which load display regions are being displayed in a distinguishable manner. The display format as above also makes it easier for the user to understand by intuition how high the loads are.

In the case of FIG. 5B, the respective colors are defined as follows.

Green indicates a load that hardly gives an influence to the internal applications.

Yellow indicates a load that may possibly give an influence to the internal applications to some extent.

Red indicates a load that is high enough to give an influence to the internal applications.

Hence, the user can be notified of not only the magnitude of a load but also an extent of an influence given to the internal applications according to the display colors.

Figure 5C:
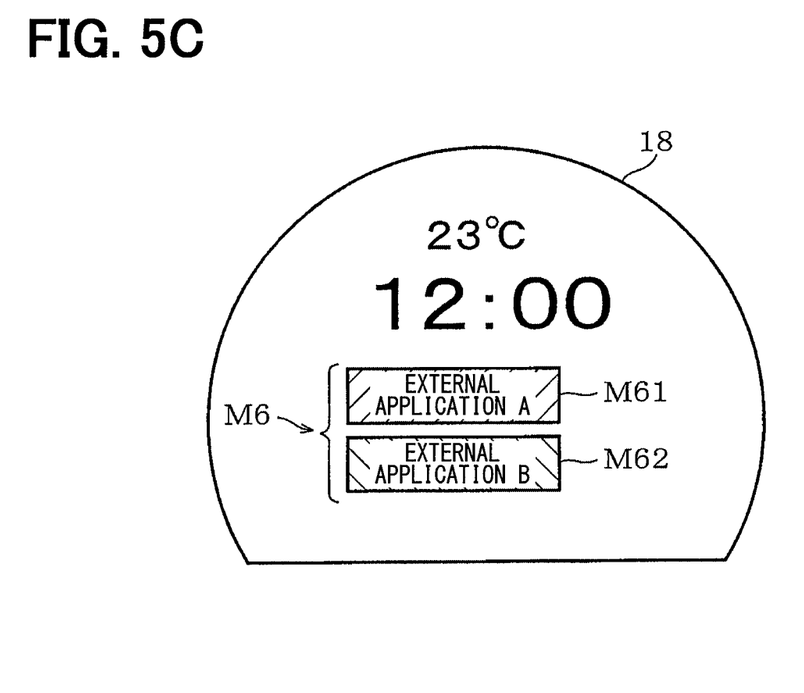
FIG. 5C is a diagram showing still another example of the display format for the meter device.

In the case of FIG. 5C, the names of the external applications are displayed in a display region M6 of the first display 18 in a distinguishable manner. In a name display region M61, "external application A" is displayed on, for example, a red solid background to schematically indicate that the load is high. In a name display region M62, "external application B" is displayed on, for example, a yellow solid background to schematically indicate that the load is high but relatively lower than the load of "external application A". Alternatively, colors of letters making up the names may be changed.

In the manner as above, the user can be notified of not only the magnitude of a load but also an extent of an influence given to the internal applications according to the display colors. When configured as above, the user, for example, a driver is less distracted from driving and safety while driving can be enhanced. In the display formats of FIG. 4 and FIG. 5A, the magnitude of a load may also be displayed in a distinguishable manner, for example, in different colors. Further, the user may be allowed to select the display formats of FIG. 4, FIG. 5A, FIG. 5B, and FIG. 5C.

(Second Embodiment)

Hereinafter, a second embodiment will be described. A configuration of a vehicular apparatus is common with the first embodiment above and a description will be given by also referring to FIG. 1, FIG. 2, and FIG. 3.

In the second embodiment, loads of external applications to be displayed in a display portion are selected according to magnitude of a load. Herein, a load determination portion 2*b* of a vehicular apparatus 1 determines magnitude of a load of an external application depending on an active state of internal applications. The configuration above is based on an concept that even when a load of an external application is high to some extent, no difficulty occurs in an operation of the vehicular apparatus 1 in the absence of an active internal application. In other words, a criterion for determining magnitude of a load of the external application depends on an active state of the internal applications.

Loads of the internal applications have already been calculated when the vehicular apparatus 1 is designed. Hence, for example, approximately how high a load of an internal application A1 will be is known in advance. That is, the vehicular apparatus 1 is not only capable of acquiring a load of an active application but also capable of acquiring in advance a load to be generated when an internal application is run.

Hence, the load determination portion 2*b* determines magnitude of a load of each external application in accordance with the determination criterion set according to a load of an internal application to be generated when the internal application is run. Specifically, the load determination portion 2*b* determines magnitude of a load in accordance with any one or a combination of multiple determination criteria as follows.

A determination criterion A corresponds to a case where a load exceeds a predetermined upper limit value.

A determination criterion B corresponds to a case where a resource required for an active internal application cannot be secured. Herein, a maximum value of the resource is concerned.

A determination criterion C corresponds to a case where a resource required to newly activate an internal application cannot be secured. Herein, the maximum value of the resource is concerned.

The vehicular apparatus 1 displays a load of an external application determined by the load determination portion 2*b* as the external application with a high load on a first display 18.

For example, when the determination criterion A is adopted, given that three external applications, namely, "external application A", "external application B", and "external application C" shown in the first embodiment above by way of example, are active and loads of "external application A" and "external application B" exceed the upper limit value. Then, as is shown in FIG. 5C, "external application A" and "external application B" are displayed on the first display 18.

When the determination criterion B is adopted and, as shown in FIG. 5B, names of the external applications, "external application A", "external application B", and "external application C", are displayed in a display region M5 of the first display 18 and magnitude of each load is indicated by any one of load display regions M51 through M53 in corresponding color. Then, a user can be notified that a resource required by the active internal application can be secured by deactivating, for example, "external application A".

When the determination criterion C is adopted, the user is able to understand magnitude of a load either directly by a numerical value or relatively by a distinguishable display, in any one of the display formats of FIG. 4, FIG. 5A, FIG. 5B, and FIG. 5C. When the user is going to newly activate an internal application, the user is to operate an operation portion 5 of the vehicular apparatus 1. Hence, it may be configured in such a manner that a display in any one of FIG. 4, FIG. 5A, FIG. 5B, and FIG. 5C is started when the user operates the operation portion 5.

The determination criteria A, B may be combined. In such a case, external applications with loads exceeding the upper limit value and therefore possibly giving an influence to an operation of an internal application may be displayed in the format as shown in, for example, FIG. 5C.

In the manner as above, by determining magnitude of a load of an external application by the load determination portion 2b in accordance with an active state of the internal applications, it is possible to prevent presentation of unnecessary information to the user. Since unnecessary information is not displayed, attention of a driver is not unnecessarily attracted to a display while driving or the like.

In a case where an operation of an internal application is already influenced by a load of an external application, when the driver makes an attempt to deactivate the external application using the vehicular apparatus 1, an operation of the vehicular apparatus 1 may be too slow to accept an input of the deactivation operation. Since the driver uses the vehicular apparatus 1 while the user is driving or the like, it is not preferable that the driver is preoccupied by operating the vehicular apparatus 1 that has become slow.

In order to eliminate such inconveniences, the vehicular apparatus 1 is configured in such a manner that the driver is able to input an external application deactivating operation using switches 13 provided in a vicinity of a meter device 12. More specifically, the user becomes able to select an external application displayed on the first display 18 and deactivate the selected external application using a stop portion 2c by operating any one of the switches 13.

A resource for the internal application can be thus secured. Also, safety can be enhanced since the driver is able to deactivate an external application without being distracted by operating the vehicular apparatus 1 that has become slow.

It may be configured in such a manner that when an external application is deactivated, a delete portion 2d deletes the deactivated external application from the vehicular apparatus 1. External applications are rich in variety. Hence, the user may find out that a load is higher than expected only after an external application the user intended to use is downloaded. In such a case, when the user opts to never again use the external application with a high load displayed on the first display 18, the vehicular apparatus 1 can improve convenience by deleting the external application.

(Other Embodiments)

It should be appreciated that the present disclosure is not limited to the embodiments described above by way of example and can be modified or extended within the scope of the present disclosure.

Loads may be displayed in a display portion 4 of a vehicular apparatus 1. In short, the display portion 4 may be used as a display portion. The configuration as above is based on the grounds as follows. That is, given that the determination criterion C described in the second embodiment above is adopted. Then, since an external application is activated with a user's operation on the vehicular apparatus 1, the user is probably looking at the display portion 4 of the vehicular apparatus 1 when the user activates the external application. Hence, by displaying an expected load in the display portion 4 while the user is looking at the display portion 4, the user becomes able to deactivate the active external application before the user starts to run the internal application. Consequently, a resource for an internal application the user wishes to newly activate can be secured in advance.

The embodiments above use the first display 18 provided to the meter device 12 as the display portion. However, a second display 19 may be used as the display portion.

The embodiments above use the switches 13 as an input portion for a deactivating operation and a delete operation. However, for example, in a case where a meter device 12 itself is formed of a liquid crystal panel or an organic EL panel and provided with a touch panel, the touch panel may be used as the input portion for a deactivating operation and a delete operation.

The embodiments above have described a case where Android is adopted as an external application runtime environment. It should be appreciated, however, that the external application runtime environment is not limited to Android. Software groups operating in other environments, such as Linux (registered trademark), can be adopted as well.

The embodiments above have described a case where the vehicular apparatus 1 is a navigation apparatus by way of example. It should be appreciated, however, that the vehicular apparatus 1 is not limited to a navigation apparatus and is also applicable to entire ECUs (Electronic Control Units) equipped to a vehicle.

What is claimed is:

1. A vehicular apparatus comprising a processor configured to:
   execute an internal application pre-installed to the vehicular apparatus and at least one external application obtained from an external device located outside the vehicular apparatus;
   acquire a load on the processor when the at least one external application is executed;
   display the acquired load on a display
   determine a magnitude of a load of each external application of the at least one external application;
   display on the display the load of any external application of the at least one external application that is determined to have a high load; and
   uninstall from the vehicular apparatus any external application that is determined to have the high load and that is selected by a user from the vehicular apparatus.

2. The vehicular apparatus according to claim 1, wherein:
   the display is provided to a meter device that is a separate body from the vehicular apparatus and equipped in advance to a vehicle.

3. The vehicular apparatus according to claim 1, wherein:
   the processor is further configured to determine the magnitude of the load of each external application of the at least one external application in accordance with an active state of the internal application.

4. The vehicular apparatus according to claim 1, the processor being further configured to:
   deactivate any external application of the at least one external application selected by the user out of the at least one external application whose loads that are displayed on in the display.

5. A vehicular apparatus system comprising:
a vehicular apparatus that includes a processor configured to
execute an internal application pre-installed to the vehicular apparatus and at least one external application obtained from an external device located outside the vehicular apparatus, and
acquire a load on the processor when each of the at least one external application is executed;
a meter device that is equipped in advance to a vehicle as a separate body from the vehicular apparatus, the meter device having a display that displays the acquired load for each of the at least one external application and is connected to the vehicular apparatus to enable mutual communications;
uninstall from the vehicular apparatus any external application from the at least one external application displayed on the display that is selected by a user from the vehicular apparatus.

6. The vehicular apparatus according to claim 5, wherein the processor is further configured to:
determine a magnitude of a load of each external application of the at least one external application,
wherein:
the display displays the load of any external application of the at least one external application determined as having a high load by the processor.

* * * * *